United States Patent
Yoshioka

(10) Patent No.: US 6,633,763 B2
(45) Date of Patent: Oct. 14, 2003

(54) APPARATUS AND METHOD FOR USING A TELEPHONE WHILE NAVIGATING

(75) Inventor: Kazunori Yoshioka, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/915,497

(22) Filed: Jul. 27, 2001

(65) Prior Publication Data

US 2001/0046884 A1 Nov. 29, 2001

Related U.S. Application Data

(62) Division of application No. 09/179,967, filed on Oct. 28, 1998.

(30) Foreign Application Priority Data

Jun. 22, 1998 (JP) .......................................... 10-175132

(51) Int. Cl.[7] .................................................. H04Q 7/20
(52) U.S. Cl. ........................ 455/457; 340/990; 701/200; 701/207
(58) Field of Search .................................. 455/456, 457, 455/564, 460; 701/200, 201, 207, 208, 209; 340/990

(56) References Cited

U.S. PATENT DOCUMENTS

| | | | |
|---|---|---|---|
| 5,155,689 A | 10/1992 | Wortham | |
| 5,353,023 A | * 10/1994 | Mitsugi | 340/989 |
| 6,085,097 A | * 7/2000 | Savery et al. | 455/456 |

FOREIGN PATENT DOCUMENTS

| | | |
|---|---|---|
| DE | 19601334 A | 7/1997 |
| EP | 0642108 A3 | 3/1995 |
| EP | 0642108 A2 | 3/1995 |
| EP | 0642108 * | 8/1995 |
| JP | A6215296 | 8/1994 |
| JP | A7192195 | 7/1995 |
| JP | A7311738 | 11/1995 |
| JP | 9113288 | 5/1997 |
| WO | WO 9521435 | 8/1995 |

* cited by examiner

Primary Examiner—Lee Nguyen
(74) Attorney, Agent, or Firm—Birch, Stewart, Kolasch & Birch, LLP

(57) ABSTRACT

A navigation device comprises a map database (12) for storing map data, and a telephone number database (13) for storing a plurality of locations and their telephone numbers, latitudes, and longitudes. The navigation device further includes an input unit (1) for allowing a user to select a desired location from among the plurality of locations stored in the telephone number database (13) and set the desired location to his or her destination, and to set a predetermined distance, and an automatically dialing unit (15) for automatically dialing a telephone number corresponding to the destination, which is stored in the telephone number database, when the distance from a current position to the destination is less than or equal to the predetermined distance while the navigation device guides the user to the destination.

18 Claims, 9 Drawing Sheets

APPARATUS AND METHOD FOR USING A TELEPHONE WHILE NAVIGATING

This application is a divisional of co-pending application Ser. No. 09/179,967, filed on Oct. 28, 1998, the entire contents of which are hereby incorporated by reference and for which priority is claimed under 35 U.S.C. §120; and this application claims priority of Application No. 10-175132 filed in JAPAN on Jun. 22, 1998 under 35 U.S.C. §119.

BACKGROUND OF THE INVENTION

1. Field of the Invention

The present invention relates to a navigation device for offering various services using telephone numbers.

2. Description of the Prior Art

Referring now to FIG. 13, there is illustrated a block diagram showing the structure of a prior art navigation device as disclosed in for example Japanese Patent Application Laying Open (KOKAI) No. 9-113288. In the figure, reference numeral 108 denotes a display and control unit comprised of a liquid crystal display 108A and a control switch panel 108B, 109 denotes the body of the navigation device, 132 denotes an antenna of a GPS receiver, 133 denotes a telephone connection unit, 120 denotes a speaker, 134 denotes a microphone, 135 denotes a mobile telephone, and 136 denotes an antenna of the mobile telephone 135.

Next, a description will be made as to the operation of the prior art navigation device. When a user selects a point on an map displayed on the screen of the liquid crystal display 108A and then selects a function of retrieving a telephone number, the prior art navigation device displays location names and person's names, which are registered in the navigation device, in the order of increasing distance from the selected point on the far-right portion of the screen. When the user further selects one of the place names and person's names on-screen, the navigation device displays the on-screen place name or person's name in reverse video and the corresponding point on the on-screen map in reverse video to emphasize that the location or person has been selected, retrieves the telephone number of the selected location or person from stored telephone number data, displays the telephone number on the far-right portion of the wide screen, and then automatically dials the telephone number. Thus, when a user selects an arbitrary point on a map on-screen, the prior art navigation device makes it possible to display one or more locations and persons associated with the selected point, allow the user to select one of them, and automatically dial the telephone number of the selected location or person.

A problem with such a prior art navigation device is that when the user wants to dial a desired telephone number through the navigation device, the user needs to manually select a location name or a person's name associated with the desired telephone number. Another problem is that the user has to determine for himself or herself whether the vehicle on which the navigation device is mounted reaches the destination, and then dial the destination's telephone number if necessary.

SUMMARY OF THE INVENTION

The present invention is made to overcome the above problems. It is therefore an object of the present invention to provide a navigation device capable of dialing a desired telephone number without having to force users to manipulate the navigation device.

It is another object of the present invention to provide a navigation device capable of displaying a desired telephone number on the screen of a display unit without requiring users to manipulate the navigation device.

In accordance with the present invention, there is provided a navigation device capable of dialing a mobile telephone connected to the navigation device, the device comprising: a map database for storing map data; a telephone number database for storing a plurality of locations and their telephone numbers, latitudes, and longitudes; a unit for allowing a user to select a desired location from among the plurality of locations stored in the telephone number database and set the desired location to his or her destination, and to set a predetermined distance; and an automatically dialing unit for automatically dialing a telephone number corresponding to the destination, which is stored in the telephone number database, when the distance from a current position to the destination is less than or equal to the predetermined distance while the navigation device guides the user to the destination according to the map database and the telephone number database.

In accordance with a preferred embodiment of the present invention, there is provided a navigation device capable of dialing a mobile telephone connected to the navigation device, the device comprising: a map database for storing map data; a telephone number database for storing a plurality of locations and their telephone numbers, latitudes, and longitudes; a unit for allowing a user to select a desired location from among the plurality of locations stored in the telephone number database and set the desired location to his or her destination; and an automatically dialing unit for automatically dialing a telephone number corresponding to the destination, which is stored in the telephone number database, when the user enters an area whose area code agrees with the one of the destination while the navigation device guides the user to the destination according to the map data base and the telephone number database.

In accordance with another preferred embodiment of the present invention, the automatically dialing unit can inform somebody on the other end of the connection of the remaining distance from the current position to the destination and the time required for the user to reach the destination, which are calculated according to the map database and the telephone number database.

In accordance with another preferred embodiment of the present invention, there is provided a navigation device comprising: a map database for storing map data; a telephone number database for storing a plurality of locations and their telephone numbers, latitudes, and longitudes; a unit for allowing a user to select a desired location from among the plurality of locations stored in the telephone number database and set the desired location to his or her destination; a unit for looking up the area code of a current position using the map database and the telephone number database; a unit for retrieving one or more telephone numbers each including the looked up area code from the telephone number database if they are registered in the telephone number database; and a unit for displaying the retrieved one or more telephone numbers and for displaying one or more marks indicating one or more locations respectively associated with the retrieved one or more telephone numbers on a map on-screen.

In accordance with another preferred embodiment of the present invention, there is provided a navigation device comprising: a map database for storing map data; a telephone number database for storing a plurality of locations and their telephone numbers, latitudes, and longitudes; a display unit for displaying a map on a screen thereof according to the map database; a scrolling unit for scrolling around the on-screen map; and a unit for, when the display unit displays a map on the screen thereof or every time the scrolling unit scrolls around the on-screen map, retrieving one or more telephone numbers respectively associated with one or more locations within the on-screen map from the telephone number database if they are registered in the telephone number database, and for displaying the retrieved one or more telephone numbers on the screen of the displaying unit.

In accordance with another preferred embodiment of the present invention, there is provided a navigation device capable of getting incoming calls through a mobile telephone connected to the navigation device, the device comprising: a map database for storing map data; a telephone number database for storing a plurality of locations and their telephone numbers, latitudes, and longitudes; and a unit for, when the mobile telephone gets an incoming call, finding out a location where somebody on the other end of the connection stays or lives unless somebody's telephone number is stored in the telephone number database, for displaying a map including the location where somebody on the other end of the connection stays or lives according to the map database and the telephone number database, and for displaying a mark indicating the location where somebody on the other end of the connection stays or lives on the on-screen map.

In accordance with another preferred embodiment of the present invention, there is provided a navigation device capable of dialing a mobile telephone connected to the navigation device, the device comprising: a map database for storing map data; a telephone number database for storing a plurality of locations and their telephone numbers, latitudes, and longitudes; and a unit for, when dialing a telephone number through the mobile telephone, finding out a location where somebody on the other end of the connection stays or lives unless the dialed or destination telephone number is stored in the telephone number database, for displaying a map including the location where somebody on the other end of the connection stays or lives according to the map database and the telephone number database, and for displaying a mark indicating the location where somebody on the other end of the connection stays or lives on the on-screen map.

Further objects and advantages of the present invention will be apparent from the following description of the preferred embodiments of the invention as illustrated in the accompanying drawings.

DETAILED DESCRIPTION OF THE PREFERRED EMBODIMENTS

First Embodiment

Figure 1:
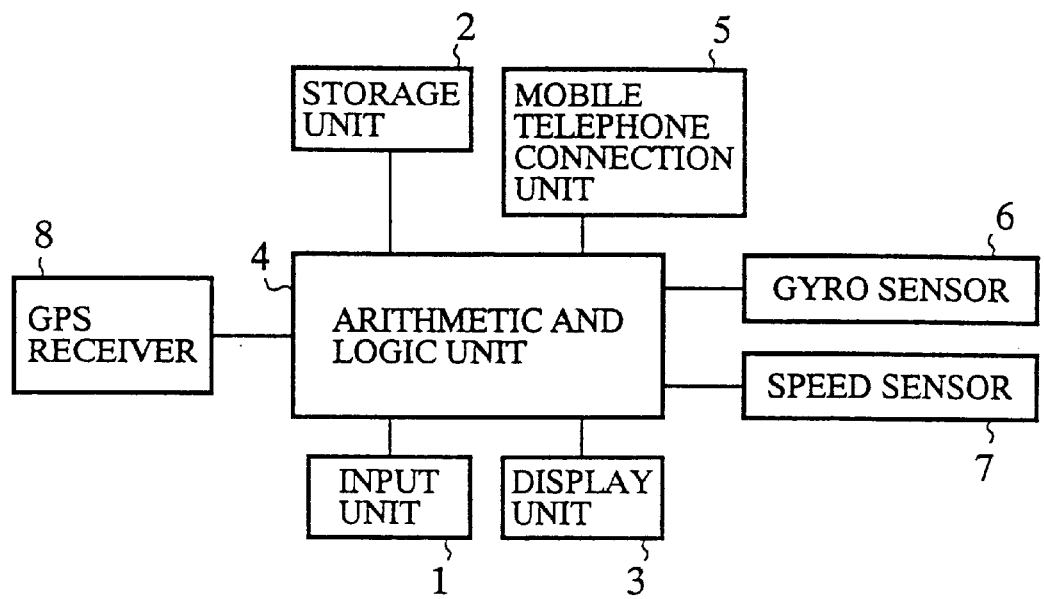
FIG. 1 is a block diagram showing the hardware structure of a navigation device according to a first embodiment of the present invention.

Referring next to FIG. 1, there is illustrated a block diagram showing the structure of a navigation device according to a first embodiment of the present invention. In the figure, reference numeral 1 denotes an input unit, such as a keyboard or a pointing device, that allows a user to enter information such as his or her desired destination, 2 denotes a storage unit, such as a CD-ROM or a DVD-ROM, for storing information, such as a map database, needed for the navigation device to search for a route and guide the user to his or her destination, 3 denotes a display unit, such as a CRT or a liquid crystal display panel, for displaying a route on the screen to guide the user to his or her destination, 4 denotes an arithmetic and logic unit for controlling the input unit 1, the storage unit 2, and the display unit 3 to perform a route searching operation and a guiding operation, 5 denotes a mobile telephone connection unit for connecting the navigation device 9 with a mobile telephone, 6 denotes a gyro sensor, 7 denotes a speed sensor, and 8 denotes a GPS receiver.

Figure 2:
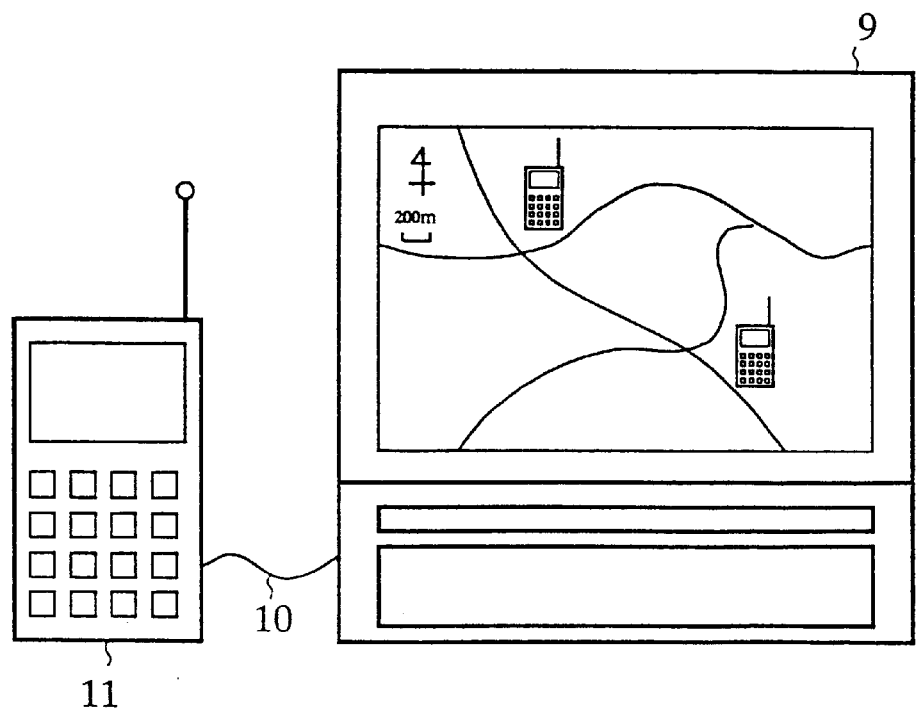
FIG. 2 is a view showing an example of a connection between the navigation device according to the first embodiment of the present invention and a mobile telephone.

As shown in FIG. 2, the navigation device 9, which is so constructed, can be connected to a mobile telephone 11 by way of for example a serial cable 10.

Figure 3:
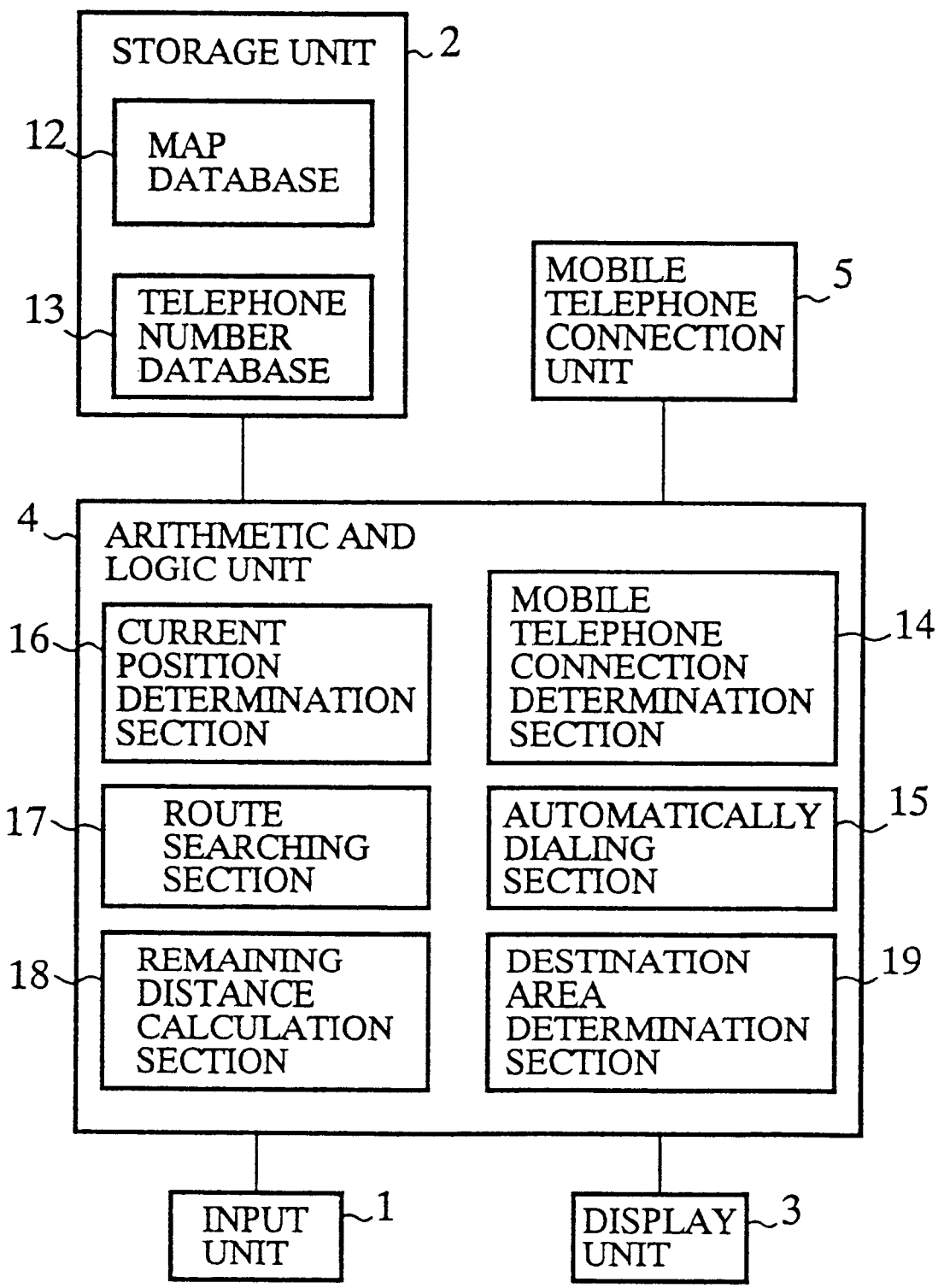
FIG. 3 is a block diagram showing the functional structure of primary constituents of the navigation device as shown in FIG. 1.

Referring next to FIG. 3, there is illustrated a block diagram showing the functional structure of the prime constituents of the navigation device as shown in FIG. 1. As shown in FIG. 3, the storage unit 2 is provided with a map database 12 and a telephone number database 13. The map database 12 stores map data needed for searching for a route and for guiding the user to his or her destination. The telephone number database 13 stores information about a plurality of locations, i.e. a plurality of location names, and their telephone numbers, latitudes and longitudes.

The arithmetic and logic unit 4 is provided with a mobile telephone connection determination section 14, an automatically dialing section 15, a current position determination section 16, a route searching section 17, a remaining distance calculation section 18, and a destination area determination section 19. The mobile telephone connection determination section 14 can determine whether or not the mobile telephone 11 is connected to the navigation device 9. The automatically dialing section 15 can dial a destination telephone number automatically through the mobile telephone 11 if a condition is satisfied. The current position determination section 16 can determine the current position of the vehicle on which the navigation device is mounted from GPS data or the like. The route searching section 17 can search for an optimum route to the destination. The remaining distance calculation section 18 can calculate the remaining distance from the current position to the destination. The destination area determination section 19 can determine if the remaining distance from the current position to the destination is less than or equal to a predetermined distance.

Figure 4:
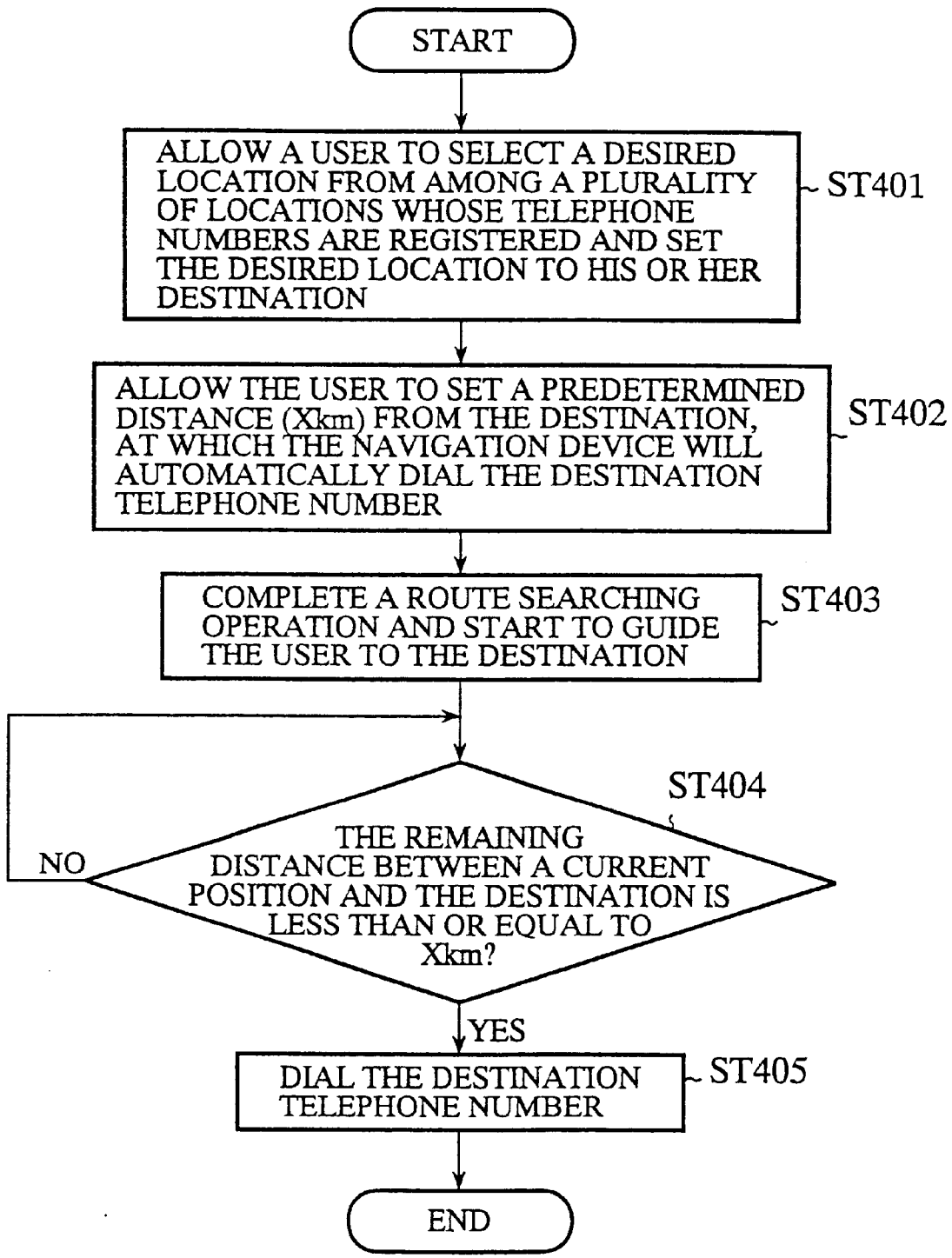
FIG. 4 is a flow diagram showing the operation of the navigation device according to the first embodiment of the present invention.
Figure 5:
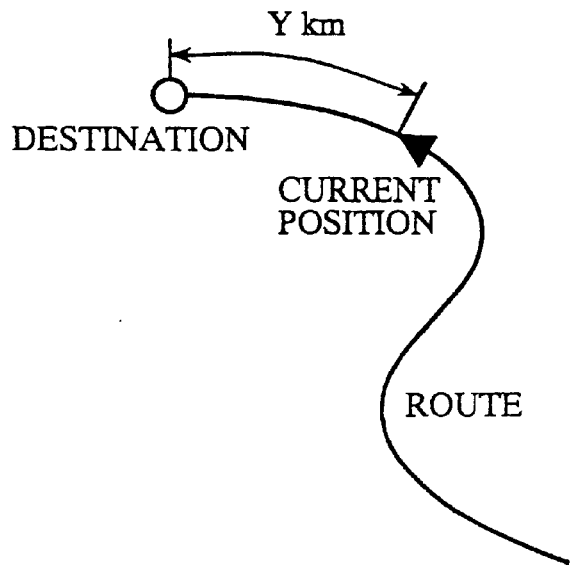
FIG. 5 is a schematic diagram showing the distance between a current position of a vehicle on which the navigation device according to the first embodiment of the present invention is mounted and a destination.
Figure 6:
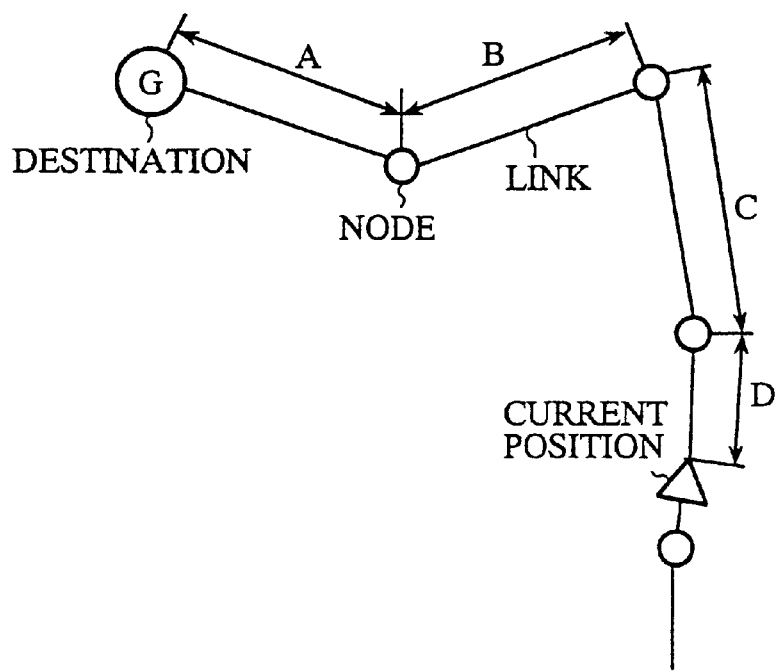
FIG. 6 is a schematic diagram for explaining a process of calculating the distance between a current position of a vehicle on which the navigation device according to the first embodiment of the present invention is mounted and a destination.

Next, a description will be made as to the operation of the navigation device according to the first embodiment of the present invention with reference to FIG. 4 showing a flow diagram showing the operation of the navigation device. The arithmetic and logic unit 4 lists a plurality of location names registered in the telephone number database 13 on the screen of the display unit 3, for example, and then allows a user to select one desired location name from the list on-screen with the input unit 1 and set the desired location to his or her destination so as to guide the user to the destination, in step ST401. The arithmetic and logic unit 4, in step ST402, also allows the user to set an automatic-dialing distance with the input unit 1. Assuming that Y (km) denotes the distance between the destination and the current position of the vehicle, as shown in FIG. 5, the arithmetic and logic unit 4 allows the automatically dialing section 15 to dial the destination telephone number automatically when Y (km) is less than or equal to a predetermined distance X (km), which is hereafter referred to as an automatic-dialing distance in this specification. The distance between the destination and the current position of the vehicle can be calculated in the following manner. First, links connecting between nodes and extending from the current position to the destination are formed by searching for some routes, and a route having some of those links whose total length is the shortest is selected and provided as the searching result, as shown in FIG. 6. The distance between the destination and the current position of the vehicle, i.e. the remaining distance is then calculated by summing the summation of the lengths of the links included in the selected route (A+B+C), and the distance from the current position to the next node (D). The route searching section 17 of the navigation device searches for the optimum route to the destination from information from the map database 12 for storing the lengths of links and node positions, the speed sensor 7, the gyro sensor 6, and the GPS receiver 8. The remaining distance calculation section 18 then calculates the remaining distance along the route to the destination.

After both the destination and the automatic-dialing distance X are set and the route searching is completed, the navigation device 9 starts to guide the user to the destination in step ST403. The destination area determination section 19 then, in step ST404, determines if the distance from the current position to the destination is less than or equal to the automatic-dialing distance X (km). If the destination area determination section 19 determines that the distance from the current position to the destination is less than or equal to the automatic-dialing distance X (km), the automatically dialing section 15, in step ST405, automatically dials the destination telephone number, which is registered in the telephone number database 13.

As previously mentioned, the navigation device according to the first embodiment of the present invention can automatically dial a destination telephone number if the remaining distance from the current position to the destination is less than or equal to a predetermined distance X (km). Accordingly, the first embodiment can provide an advantage of being able to timely inform a person who the user will meet that the user will reach the destination in a short time. Furthermore, since the user or driver does not need to be aware that he or she will have to dial the destination telephone number while he or she is driving, the navigation device of the first embodiment can enable users to drive carefully.

Second Embodiment

A navigation device according to a second embodiment of the present invention is provided with a destination area determination section 19 that can determine whether the vehicle on which the navigation device is mounted enters an area whose area code agrees with the area code of the destination. The other structure of the navigation device of the second embodiment is the same as that of the navigation device according to the aforementioned first embodiment as shown in FIGS. 1 and 3. Therefore, the description of the other structure will be omitted hereafter.

Figure 7:
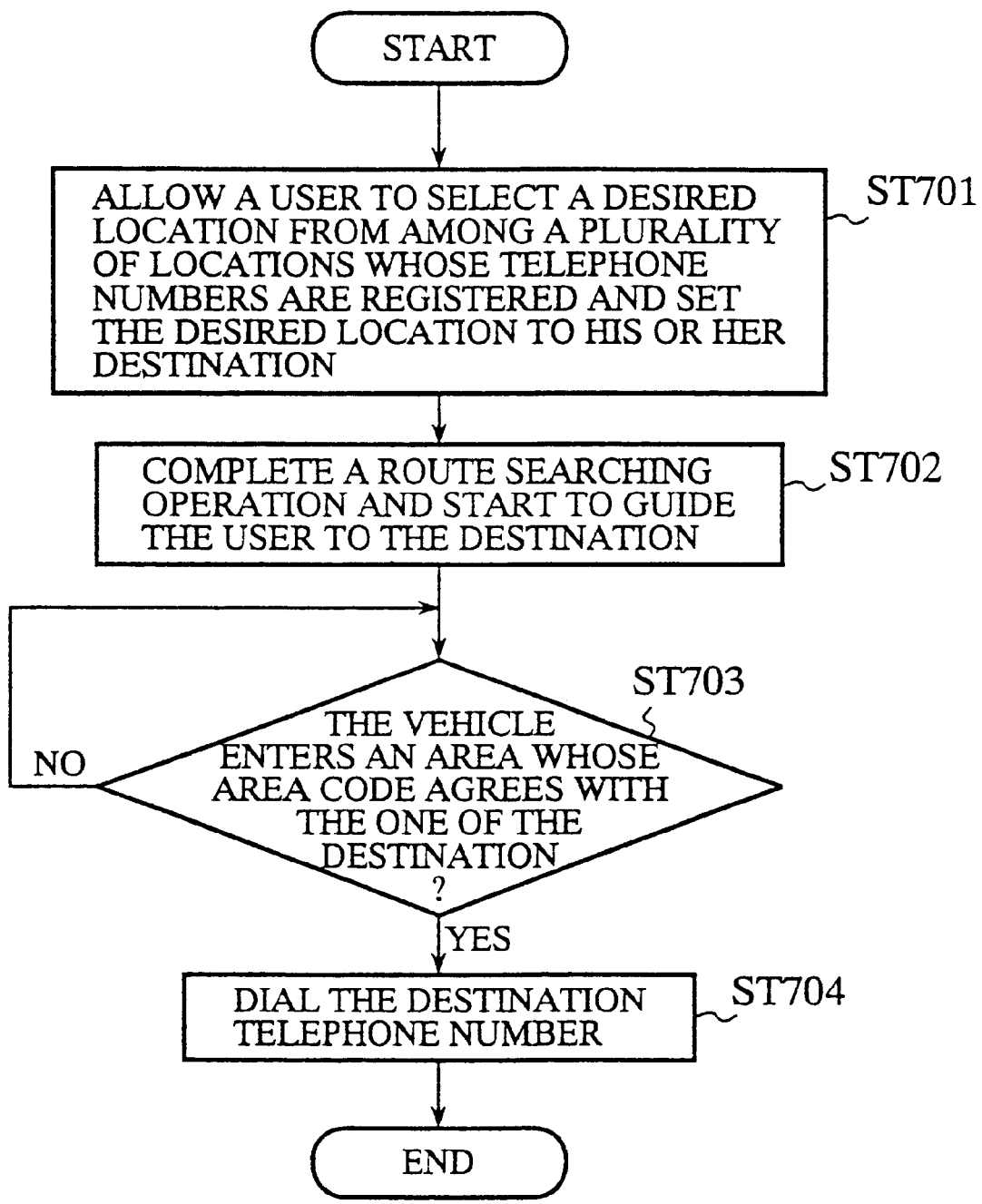
FIG. 7 is a flow diagram showing the operation of a navigation device according to a second embodiment of the present invention.

Next, a description will be made as to the operation of the navigation device according to the second embodiment of the present invention with reference to FIG. 7 showing a flow diagram showing the operation of the navigation device. An arithmetic and logic unit 4 lists a plurality of location names registered in a telephone number database 13 on the screen of a display unit 3, for example, and then allows a user to select one desired location name from the list on-screen with an input unit 1 and set the desired location to his or her destination so as to guide the user to the destination, in step ST701. The navigation device then, in step ST702, searches for an optimum route to the destination, and, after that, starts to guide the user to the destination.

Figure 8:
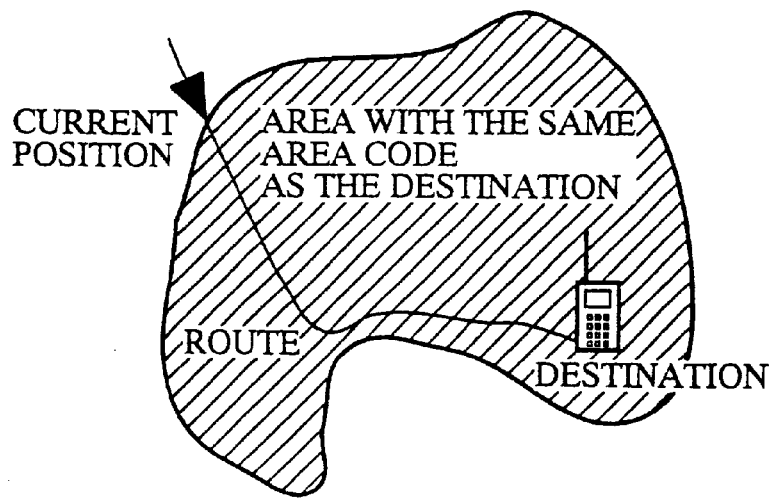
FIG. 8 is a schematic diagram showing a certain area whose area code agrees with the area code of a destination.

While the navigation device guides the user to the destination, the destination area determination section 19, in step ST703, determines whether the vehicle on which the navigation device is mounted enters an area whose area code agrees with the one of the destination, as shown in FIG. 8. If the destination area determination section 19 determines that the vehicle on which the navigation device is mounted enters an area whose area code agrees with the one of the destination, an automatically dialing section 15, in step ST704, automatically dials the telephone number of the destination, which is registered in a telephone number database 13.

As previously mentioned, the navigation device according to the second embodiment of the present invention can automatically dial a destination telephone number, which is registered in the telephone number database 13, when the vehicle on which the navigation device is mounted enters an area whose area code agrees with the one of the destination. Accordingly, the second embodiment can provide an advantage of being able to timely inform a person who the user will meet that the user will reach the destination in a short time. Furthermore, since the user or driver does not need to be aware that he or she will have to dial the destination telephone number while he or she is driving, the navigation device of the second embodiment can enable the user to drive carefully. In addition, as compared with the first embodiment mentioned above, the second embodiment can offer another advantage of eliminating the setting of an automatic-dialing distance.

In accordance with a variant of the exemplary first and second embodiments shown, there is provided a navigation device that can inform a person who the user will meet of the remaining distance and the estimated time required for the vehicle to reach the destination using a recorded voice such as an artificial (or computer-generated) voice after it automatically dials a destination telephone number. In this case, the driver does not need to talk to the person who the user will meet through the mobile telephone. Accordingly, the driver can drive more carefully.

Third Embodiment

A navigation device according to a third embodiment of the present invention is provided with an arithmetic and logic unit 4 that can find out (or look up) the area code of a location where the vehicle on which the navigation device is mounted is moving and then enable a display unit 3 to display telephone numbers including the area code, which are registered in a telephone number database 13, on the screen thereof. The other structure of the navigation device of the third embodiment is the same as that of the navigation device according to the aforementioned first embodiment as shown in FIG. 1. Therefore, the description of the other structure will be omitted hereafter.

Figure 9:
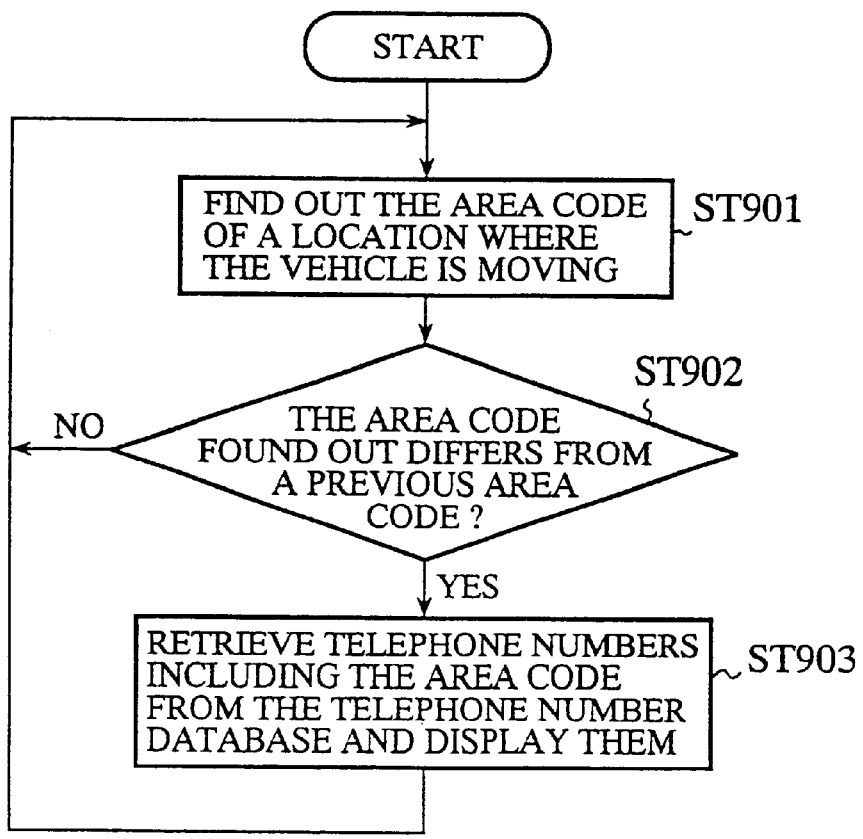
FIG. 9 is a flow diagram showing the operation of a navigation device according to a third embodiment of the present invention.
Figure 10:
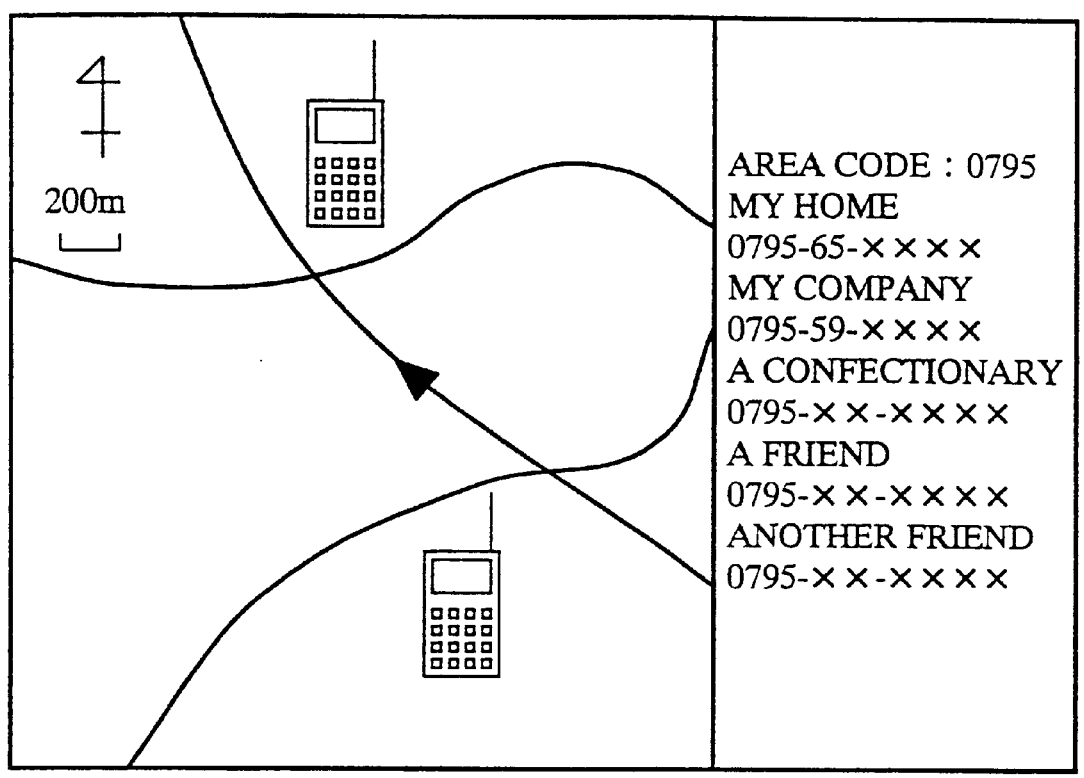
FIG. 10 is a view showing an example of a screen display produced by the navigation device according to the third embodiment of the present invention.

Next, a description will be made as to the operation of the navigation device according to the third embodiment of the present invention with reference to FIG. 9 showing a flow diagram showing the operation of the navigation device. The arithmetic and logic unit 4, in step ST901, looks up the area code of a location where the vehicle on which the navigation device is mounted is moving from the current position of the vehicle determined by a current position determination section 16. The arithmetic and logic unit 4 then, in step ST902, determines if the area code differs from the previous area code that was previously found out by the arithmetic and logic unit 4. If the arithmetic and logic unit 4 determines that the current area code differs from the previous area code which was previously found out by the arithmetic and logic unit 4, it, in step ST903, retrieves one or more telephone numbers including the area code currently found out from the telephone number database 13 if they are registered in the telephone number database 13 and then displays those telephone numbers beside a map displayed on the screen of the display unit 3 and marks indicating the positions associated with the telephone numbers, as shown in FIG. 10. For example, each of the marks can have a graphical form indicating a mobile telephone, as shown in FIG. 10. When the user further selects one of the telephone numbers listed beside the on-screen map, unless the location corresponding to the selected telephone number is shown on the map, the arithmetic and logic unit 4 scrolls around the map so that a map including the corresponding location is displayed.

As previously mentioned, the navigation device according to the third embodiment of the present invention can display telephone numbers including the currently found out area code of a location where the vehicle is moving on the screen of the display unit 3 and then allow the user to select one telephone number to display a map on which the location associated with the selected telephone number is shown. In addition, the user can dial one of the on-screen telephone numbers in case of emergency by referring to the on-screen telephone number list.

Fourth Embodiment

A navigation device according to a fourth embodiment of the present invention is provided with an arithmetic and logic unit 4 that can retrieve telephone numbers associated with an on-screen map from a telephone number database 13 and then enable a display unit 3 to display marks indicating the locations associated with the retrieved telephone numbers on the on-screen map and the telephone numbers beside the on-screen map. The other structure of the navigation device of the fourth embodiment is the same as that of the navigation device according to the aforementioned first embodiment as shown in FIG. 1. Therefore, the description of the other structure will be omitted hereafter.

Figure 11A:
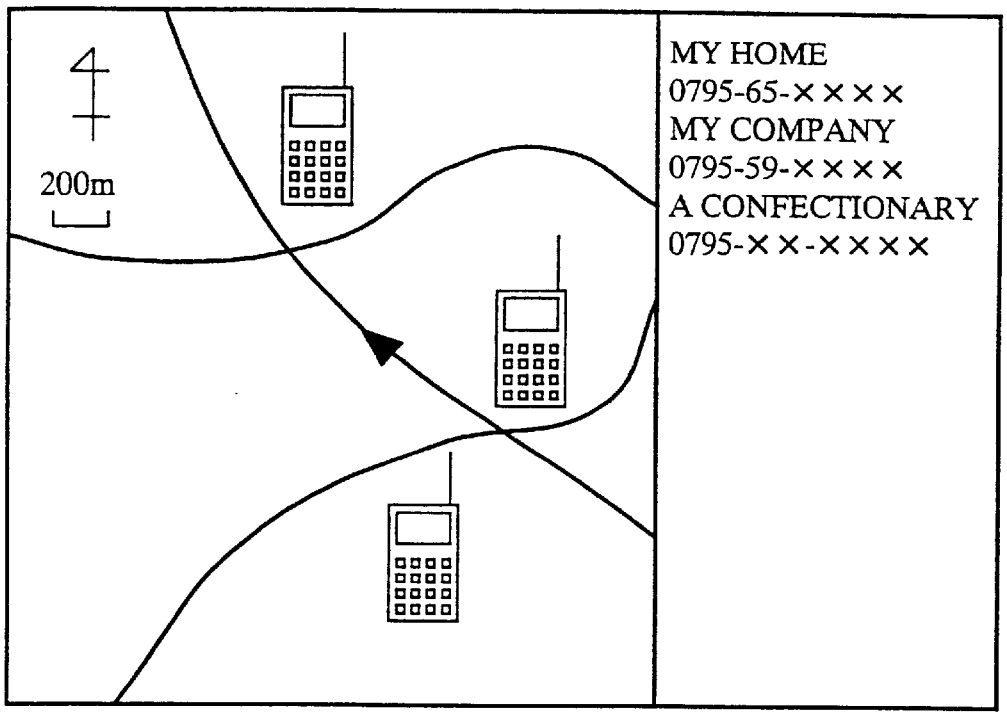
FIG. 11(a) is a view showing an example of a screen display produced by a navigation device according to a fourth embodiment of the present invention.
Figure 11B:
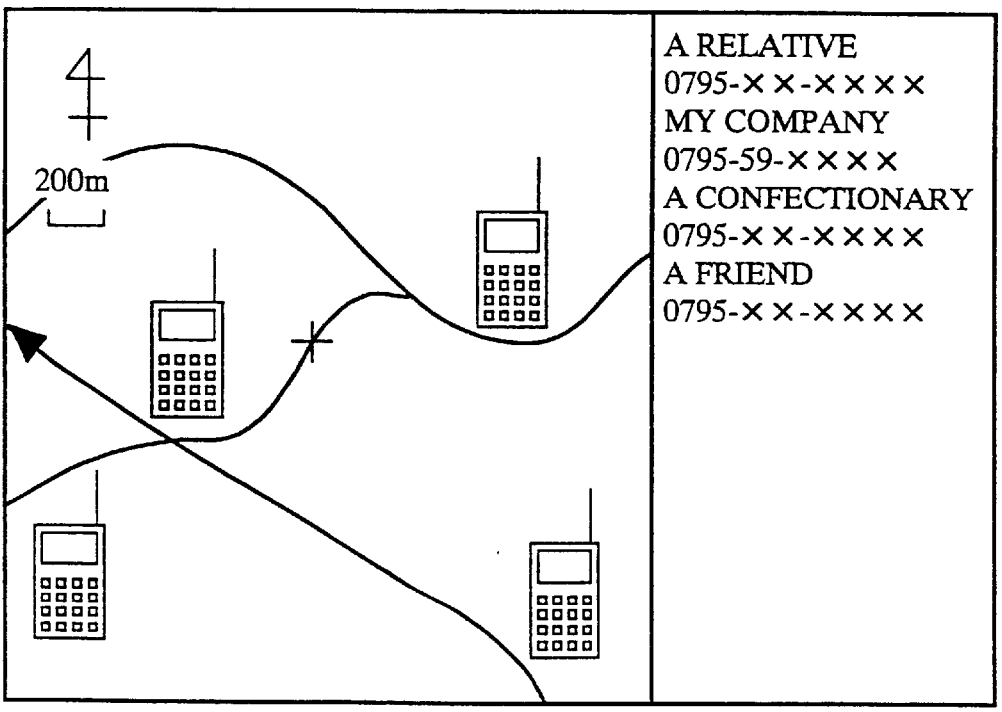
FIG. 11(b) is a view showing a screen display produced after the map as shown in FIG. 11(a) is scrolled around.

Next, a description will be made as to the operation of the navigation device according to the fourth embodiment of the present invention. As shown in FIG. 11(a), the arithmetic and logic unit 4 retrieves one or more telephone numbers associated with their respective locations shown in an on-screen map from the telephone number database 13 if they are registered in the telephone number database 13, and then enables the display unit 3 to display marks indicating the locations associated with the retrieved telephone numbers on the on-screen map and the telephone numbers beside the on-screen map. For example, each of the marks can have a graphical form indicating a mobile telephone, as shown in FIG. 11(a). After that, every time the arithmetic and logic unit 4 scrolls around the map displayed on the display unit 3 in response to an input operation done by a user with an input unit 1, the arithmetic and logic unit 4 retrieves one or more telephone numbers associated with their respective locations shown in an on-screen map displayed after scrolled around from the telephone number database 13 if they are registered in the telephone number database 13, and then enables the display unit 3 to display marks indicating the locations associated with the retrieved telephone numbers on the on-screen map and the telephone numbers beside the on-screen map, as shown in FIG. 11(b).

As previously mentioned, every time a user scrolls around an on-screen map, the navigation device according to the fourth embodiment of the present invention retrieves one or more telephone numbers associated with an on-screen map displayed after scrolled around from the telephone number database 13 if they are registered in the telephone number database 13, and then displays marks indicating the locations associated with the retrieved telephone numbers on the map and the telephone numbers on the screen of the display unit. Accordingly, the fourth embodiment of the present invention offers an advantage of being able to automatically display telephone numbers about which the user is curious most.

Fifth Embodiment

A navigation device according to a fifth embodiment of the present invention is provided with an arithmetic and logic unit 4 that when a mobile telephone connected to the navigation device gets an incoming call, can enable a display unit 3 to display a map including the location associated with the source telephone number of the party on the other end of the connection on the screen thereof and a mark indicating the location of somebody on the other end of the connection on the on-screen map. The other structure of the navigation device of the fifth embodiment is the same as that of the navigation device according to the aforementioned first embodiment as shown in FIG. 1. Therefore, the description of the other structure will be omitted hereafter.

Figure 12:
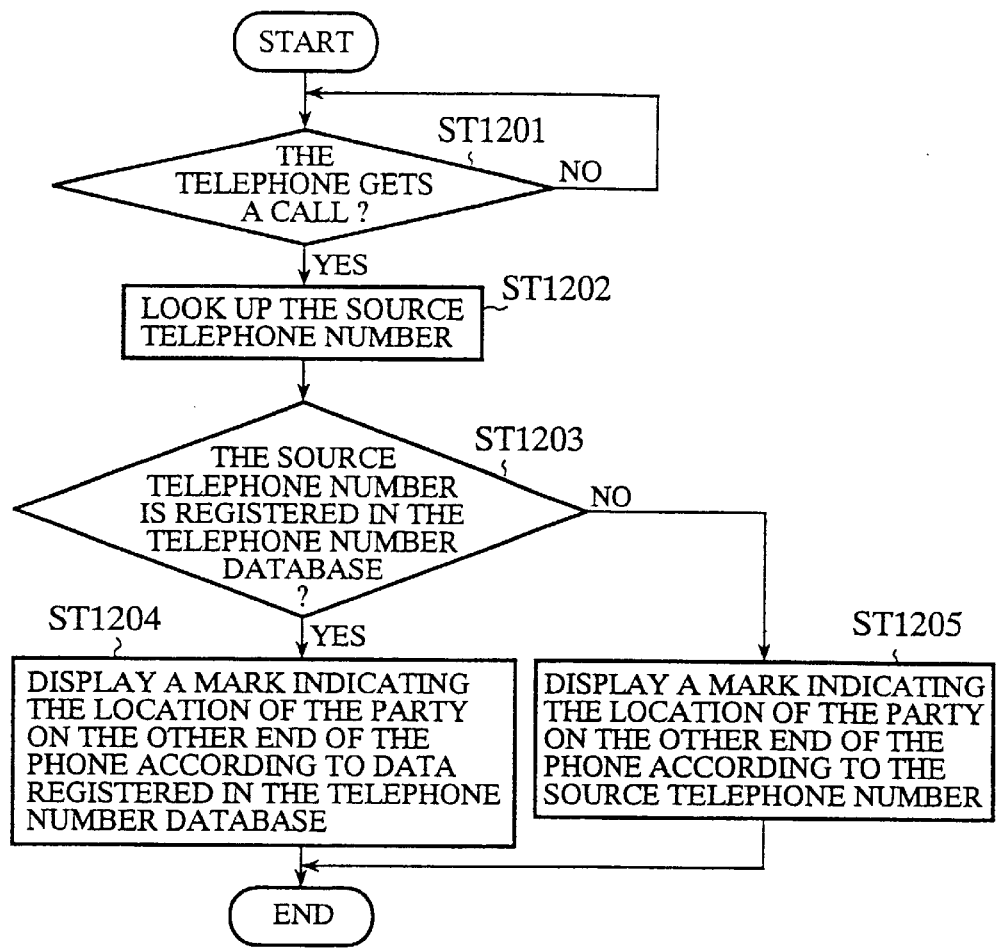
FIG. 12 is a flow diagram showing the operation of a navigation device according to a fifth embodiment of the present invention.
Figure 13:
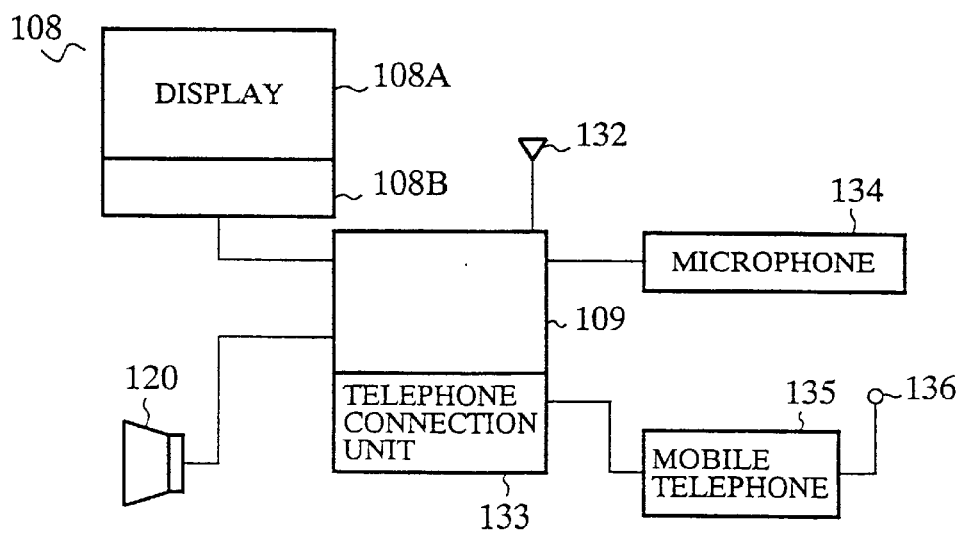
FIG. 13 is block diagram showing the structure of a prior art navigation device.

Next, a description will be made as to the operation of the navigation device according to the fifth embodiment of the present invention with reference to FIG. 12 showing a flow diagram showing the operation of the navigation device. The arithmetic and logic unit 4, in step ST1201, determines if a mobile telephone 11 connected to the navigation device 9 of the fifth embodiment gets an incoming call now. If the mobile telephone 11 receives an incoming call now, the arithmetic and logic unit 4, in step ST1202, finds out the source telephone number of the party on the other end of the connection. The arithmetic and logic unit 4 then, in step ST1203, determines whether or not the source telephone number of the party on the other end of the connection is registered in a telephone number database 13. If the source telephone number of the party on the other end of the connection is registered in the telephone number database 13, the arithmetic and logic unit 4, in step ST1204, enables the display unit 3 to display a map including the location associated with the source telephone number on the screen thereof and a mark indicating the location of somebody on the other end of the phone on the on-screen map according to corresponding data stored in the telephone number database 13. On the other hand, unless the source telephone number of the party on the other end of the connection is registered in the telephone number database 13, the arithmetic and logic unit 4, in step ST1205, allows the display unit 3 to display a map including the location associated with the source telephone number on the screen thereof and a mark indicating the location of somebody on the other end of the phone on the on-screen map according to the source telephone number, e.g. an area code included in the source telephone number.

As previously mentioned, every time a mobile telephone connected to the navigation device according to the fifth embodiment of the present invention gets an incoming call, the navigation device can display a mark indicating the location of somebody on the other end of the phone on an on-screen map. Accordingly, the fifth embodiment of the present invention can provide an advantage of being able to make the user directly recognize the location of somebody on the other end of the connection.

Sixth Embodiment

A navigation device according to a sixth embodiment of the present invention is provided with an arithmetic and logic unit 4 that, when either the navigation device or a user dials a mobile telephone connected to the navigation device, can find out the destination telephone number which the user is dialing, and enable a display unit 3 to display a map including the location associated with the destination telephone number of the party on the other end of the connection on the screen thereof and a mark indicating the location of somebody on the other end of the phone on the on-screen map. The other structure of the navigation device of the sixth embodiment is the same as that of the navigation device according to the aforementioned first embodiment as shown in FIG. 1. Therefore, the description of the other structure will be omitted hereafter.

Next, a description will be made as to the operation of the navigation device according to the sixth embodiment of the present invention. When either the navigation device 9 of the sixth embodiment or a user dials a mobile telephone 11 connected to the navigation device, the arithmetic and logic unit 4 finds out the destination telephone number of the party on the other end of the connection. The arithmetic and logic unit 4 then determines whether or not the destination telephone number of the party on the other end of the connection is registered in a telephone number database 13. If the destination telephone number of the party on the other end of the connection is registered in the telephone number database 13, the arithmetic and logic unit 4 enables the display unit 3 to display a map including the location associated with the destination telephone number on the screen thereof and a mark indicating the location of somebody on the other end of the phone on the on-screen map according to corresponding data stored in the telephone number database 13. On the other hand, unless the destination telephone number of the party on the other end of the connection is registered in the telephone number database 13, the arithmetic and logic unit 4 enables the display unit 3 to display a map including the location associated with the destination telephone number on the screen thereof and a mark indicating the location of somebody on the other end of the phone on the on-screen map according to the destination telephone number, e.g. an area code included in the destination telephone number.

As previously mentioned, every time either the navigation device according to the sixth embodiment of the present invention or a user dials a mobile telephone connected to the navigation device, the navigation device can display a mark indicating the location of somebody on the other end of the connection on an on-screen map. Accordingly, the sixth embodiment of the present invention can provide an advantage of being able to make the user directly recognize the location of somebody on the other end of the phone.

Many widely different embodiments of the present invention may be constructed without departing from the spirit and scope of the present invention. It should be understood that the present invention is not limited to the specific embodiments described in the specification, except as defined in the appended claims.

What is claimed is:

1. A navigation device comprising:
   a map database storing map data;
   a telephone number database storing plural telephone numbers and corresponding location information;
   a processor obtaining the area code of a current position using said map database;
   a processor identifying telephone numbers stored in said telephone number database based on said obtained area code, said processor identifying the telephone numbers if said obtained area code is different from a previously obtained area code; and
   a device showing said identified telephone numbers and showing location information corresponding to said identified telephone numbers, wherein
   the device shows location information corresponding to said identified telephone numbers by using a symbol representing each said identified telephone number and placing the symbols at the correct latitude and longitude on a display map.

2. The navigation device according to claim 1, wherein the device shows the present location of the navigation device on a display map at the correct latitude and longitude position of the navigation device.

3. The navigation device according to claim 2, wherein the device further shows the location of a desired destination as a symbol on the display map at the correct latitude and longitude position of the desired destination.

4. The navigation device according to claim 3, wherein the device further shows the distance between the present location and the desired destination location on the display map.

5. A navigation device comprising:

a map database storing map data;

a telephone number database storing plural telephone numbers and corresponding location information;

a telephone transceiver;

a processor identifying the source telephone number of a telephone call incoming to said transceiver;

a processor using said map database and said telephone number database to identify location information corresponding to said identified telephone number; and a device showing said identified telephone number and location information corresponding to said identified telephone number.

6. The navigation device according to claim 5, wherein the device shows location information corresponding to said identified telephone numbers by using a symbol representing each said identified telephone number and placing the symbols at the correct latitude and longitude on a display map.

7. The navigation device according to claim 5, wherein the device shows the present location of the navigation device on a display map at the correct latitude and longitude position of the navigation device.

8. The navigation device according to claim 7, wherein the device further shows the location of a desired destination as a symbol on the display map at the correct latitude and longitude position of the desired destination.

9. The navigation device according to claim 8, wherein the device further shows the distance between the present location and the desired destination location on the display map.

10. A method for using a telephone in a mobile environment, said method comprising:

storing map data in a map database;

storing plural telephone numbers and corresponding location information in a telephone database;

obtaining the area code of a current position using said map database;

identifying telephone numbers stored in said telephone number database based on said obtained area code, said identifying step occurring if said obtained area code is different from a previously obtained area code; and showing said identified telephone numbers and showing location information corresponding to said identified telephone numbers, wherein the step of showing further shows location information corresponding to said identified telephone numbers by using a symbol representing each said identified telephone number and placing the symbols at the correct latitude and longitude on a display map.

11. The method according to claim 10, wherein the step of showing further shows the present location of the navigation device on a display map at the correct latitude and longitude position of the navigation device.

12. The method according to claim 11, wherein the step of showing further shows the location of a desired destination as a symbol on the display map at the correct latitude and longitude position of the desired destination.

13. The method according to claim 12, wherein the step of showing further shows the distance between the present location and the desired destination location on the display map.

14. A method for using a telephone in a mobile environment, said method comprising:

storing map data in a map database;

storing plural telephone numbers and corresponding location information in a telephone database;

identifying the source telephone number of a telephone call incoming to said telephone;

using said map database and said telephone number database to identify location information corresponding to said identified telephone number; and showing said identified telephone number and showing location information corresponding to said identified telephone number.

15. The method according to claim 14, wherein the step of showing further shows location information corresponding to said identified telephone numbers by using a symbol representing each said identified telephone number and placing the symbols at the correct latitude and longitude on a display map.

16. The method according to claim 14, wherein the step of showing further shows the present location of the navigation device on a display map at the correct latitude and longitude position of the navigation device.

17. The method according to claim 16, wherein the step of showing further shows the location of a desired destination as a symbol on the display map at the correct latitude and longitude position of the desired destination.

18. The method according to claim 17, wherein the step of showing further shows the distance between the present location and the desired destination location on the display map.

* * * * *